United States Patent [19]

Gennesseaux

[11] Patent Number: 5,369,348

[45] Date of Patent: Nov. 29, 1994

[54] DEVICE FOR ATTENUATING THE PERIODIC VIBRATIONS OF A MECHANICAL STRUCTURE

[75] Inventor: André Gennesseaux, Paris, France

[73] Assignee: Hutchinson S.A., Paris, France

[21] Appl. No.: 889,336

[22] Filed: May 28, 1992

[30] Foreign Application Priority Data

May 31, 1991 [FR] France ............................ 91 06580

[51] Int. Cl.$^5$ ............................................. G05B 5/01
[52] U.S. Cl. .................................... 318/623; 318/460;
318/649; 310/51
[58] Field of Search ............... 318/611, 623, 649, 460,
318/628–629, 632, 456–460, 488–489, 128;
364/505–506, 508, 507, 572, 148, 158;
73/662–668; 310/51, 90.5, 90; 188/378–380

[56] References Cited

U.S. PATENT DOCUMENTS

| | | | |
|---|---|---|---|
| 4,085,825 | 4/1978 | Scarborough | 188/1 B |
| 4,483,425 | 11/1984 | Newman | 188/378 |
| 4,626,754 | 12/1986 | Habermann et al. | 318/460 |
| 4,806,835 | 2/1989 | Habermann | 318/460 X |
| 4,929,874 | 5/1990 | Mizuno et al. | 318/649 X |
| 4,963,804 | 10/1990 | Geiger | 318/460 |
| 4,999,534 | 3/1991 | Andrianos | 318/649 X |
| 5,005,439 | 4/1991 | Jensen et al. | 73/667 X |
| 5,008,606 | 4/1991 | Koehler et al. | 318/649 |
| 5,012,174 | 4/1991 | Adkins et al. | 318/649 |
| 5,032,776 | 7/1991 | Garagnon | 318/611 |
| 5,049,795 | 9/1991 | Moulds, III | 318/640 X |
| 5,116,029 | 5/1992 | Gennesseaux | 367/140.1 AE |
| 5,180,958 | 1/1993 | Choshitani et al. | 318/623 |
| 5,202,824 | 4/1993 | Chen | 318/649 X |

FOREIGN PATENT DOCUMENTS 0348087 12/1989 European Pat. Off. .
0409462 1/1991 European Pat. Off. .
0412853 2/1991 European Pat. Off. .

OTHER PUBLICATIONS

Patent Abstracts of Japan; vol. 11, No. 48 (M-561) (2495) 13 Feb. 1987 & SP-A61 211 548 (Tech Res & Dev Inst of Japan Def Agency) 19 Sep. 1986.
Patent Abstracts of Japan; vol. 8, No. 76 (M-288) (1513) 9 Apr. 1984 & JP-A-58 221 038 (Mitsubishi Denki) 22 Dec. 1983.

*Primary Examiner*—William M. Shoop, Jr.
*Assistant Examiner*—David Martin
*Attorney, Agent, or Firm*—Larson & Taylor

[57] ABSTRACT

A device for attenuating the periodic vibrations of a mechanical structure adapted to obtain cancellation of periodic vibrations of rotating machines including at least one transducer, detecting original vibrations, delivering a detected signal, a detector of the periodicity of these vibrations delivering a synchronizing signal, and a control circuit and a transducer generating compensation vibrations which are applied to the mechanical structure. The control circuit includes a circuit for synchronous filtering of the detected signal, controlled by the synchronizing signal and delivering a filtered signal whose frequency spectrum contains only the instaneous fundamental frequency of the detected signal. A circuit for regulating the filtered signal delivers an antivibration-control signal applied to a generating transducer in order to minimize the amplitude of the detected signal.

10 Claims, 4 Drawing Sheets

DEVICE FOR ATTENUATING THE PERIODIC VIBRATIONS OF A MECHANICAL STRUCTURE

FIELD OF THE INVENTION

The invention relates to a device for attenuating the periodic vibrations of a mechanical structure.

BACKGROUND ART

When a mechanical structure is the seat of periodic vibrations, or noises, a known general procedure consists in engendering and applying to this mechanical structure, by means of an actuator, a compensation vibration or noise, in phase opposition with the original noise or vibrations. This method is called the active antivibration method.

Effecting the control which will produce the damping of the vibrations or noises, that is to say the generation of the compensation vibration or noise, is tricky since the degree of damping or cancellation of the original vibration ultimately obtained depends on the accuracy in amplitude and in phase of the compensation vibration.

The currently proposed devices, for the reasons indicated previously, do not give full satisfaction.

Among the latter, two operating modes have been proposed.

Figure 1A:
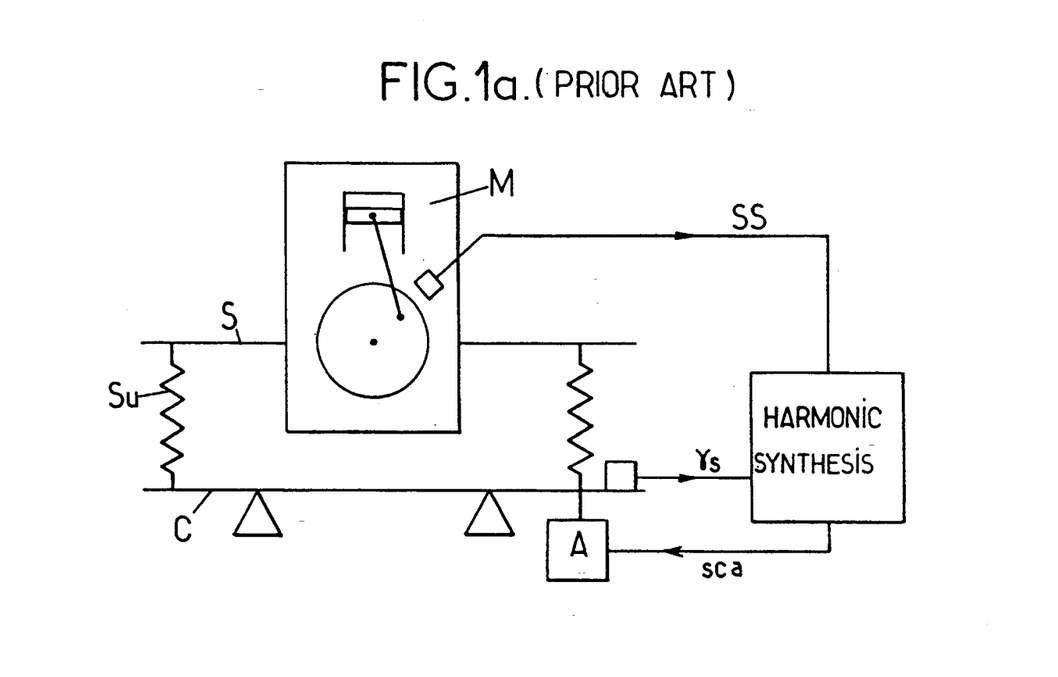

A first operating mode, illustrated by FIG. 1a, consists in synthesizing the compensation vibration harmonic by harmonic, by using a synchronizing signal arising from the periodic vibration itself.

Such an operating mode has been described in particular by the international patent application WO 83/01525 published on Apr. 28, 1983.

In such an operating mode, the calibration, in amplitude and in phase, of the harmonics is performed in such a way as to cancel out the acceleration signal $\gamma$ measured by means of an accelerometer placed on the structure to be protected.

The disadvantage of the abovementioned operating mode is that the latter is not suited to non-stationary noise and vibration phenomena since the convergence time of the system is relatively long; furthermore, and for this reason, the synthesis of the compensation vibration can be performed only on a restricted discrete number of harmonics, this hampering the accuracy in amplitude and in phase of the reconstituted compensation vibration, in relation to the original vibration, and ultimately the degree of attenuation of the latter.

Figure 1B:
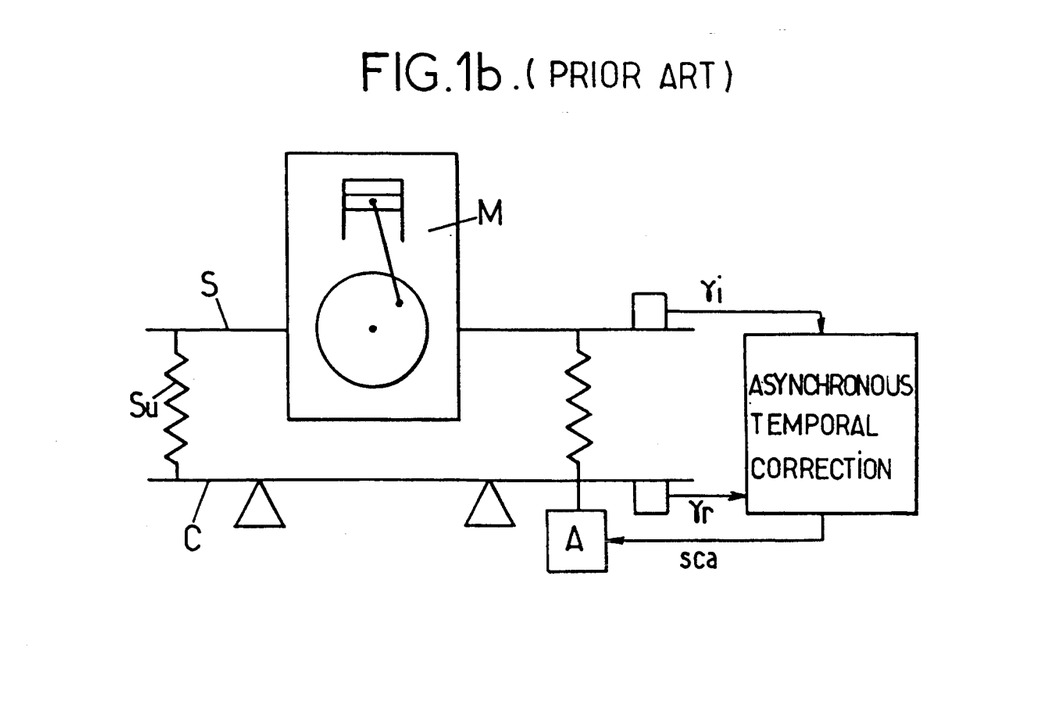

The second operating mode proposed hitherto consists in making no assumption about the nature or waveform of the original vibration, the latter, as represented in FIG. 1b, being detected and measured by means of a second sensor delivering a signal representing the incident acceleration $\gamma i$. This signal is processed by an auto-adaptive filter with variable coefficients, F.A.A., delivering the compensation vibration, the detection and measurement of the residual acceleration $\gamma r$ then making it possible to match the coefficients of the filter so as to render the signal for controlling the compensation vibration a minimum. The abovementioned operating mode therefore employs a mode of temporal processing.

A disadvantage of this operating mode is that all the signals engendered by the sensors are eventually processed by the system, in the absence of synchronization in regard to the periodic character of the original vibration. Such a disadvantage is liable to lead to major problems when, for example, the noise level is significant, or when the natural resonant modes of the mechanical structure, when the latter is suspended, are excited, the corresponding device not being in any case in a position to perform a corresponding discrimination with a view to the processing of the original vibration alone.

SUMMARY OF THE INVENTION

The aim of the present invention is to remedy all the abovementioned disadvantages.

Another aim of the present invention is also the implementing of a device for damping or cancelling out the periodic vibrations of a mechanical structure, the operating mode of which furthermore brings together the advantages of the two abovementioned operating modes of the prior art.

Another aim of the present invention is lastly, the implementing of a device for damping or cancelling out the periodic vibrations of a mechanical structure of high accuracy, the amplitude of the residual vibration of the mechanical structure, by virtue of the implementing of the device according to the invention, possibly being rendered less than 10% of the amplitude of the original vibration.

The device for damping the periodic vibrations of a mechanical structure, which is the subject of the present invention, comprises at least one transducer detecting these vibrations and delivering a detected signal, a detector of the periodicity of these vibrations delivering a synchronizing signal, a control circuit and a transducer generating compensation vibrations applied to said mechanical structure in order to compensate for the periodic vibrations or original vibration.

It is notable in that the control circuit includes at least one circuit for synchronous filtering of the said detected signal, controlled by the synchronizing signal, the filtering circuit delivering a filtered signal whose frequency spectrum contains only the instantaneous fundamental frequency of the detected signal and/or its harmonic frequencies, and a circuit for regulating the filtered signal receiving the latter and delivering an antivibration-control signal applied to the said generating transducer, in order to engender on this mechanical structure a compensation vibration in such a way as to minimize the amplitude of the detected signal.

The device which is the subject of the invention finds application to the stabilizing of rotating machines of any type in which the existence of a residual imbalance communicates to the mechanical structure of this machine a corresponding, periodic original vibration.

Brief Description of the Drawing

A more detailed description of the device which is the subject of the invention will be given in the description below and in the drawings in which, part from FIGS. 1a and 1b, relating to the prior art, FIG. 3 represents an advantageous non-limiting embodiment of the device which is the subject of the invention, in accordance with the basic diagram of FIG. 2a.

Detailed Description of the Preferred Embodiments

A more detailed description of a device for damping the periodic vibrations (or noise) of a mechanical structure, which is the subject of the present invention, will be given in connection with FIG. 2a.

In the abovementioned figure, it will be noted that the mechanical structure is denoted S, this mechanical structure being, for example, and in a nonlimiting manner, fixed or mobile, and including a rotating machine, denoted M. It will be noted in particular that the rotating machine M can consist of any type of machine such as an electric motor, an internal combustion engine or an alternator, for example.

Figure 2A:
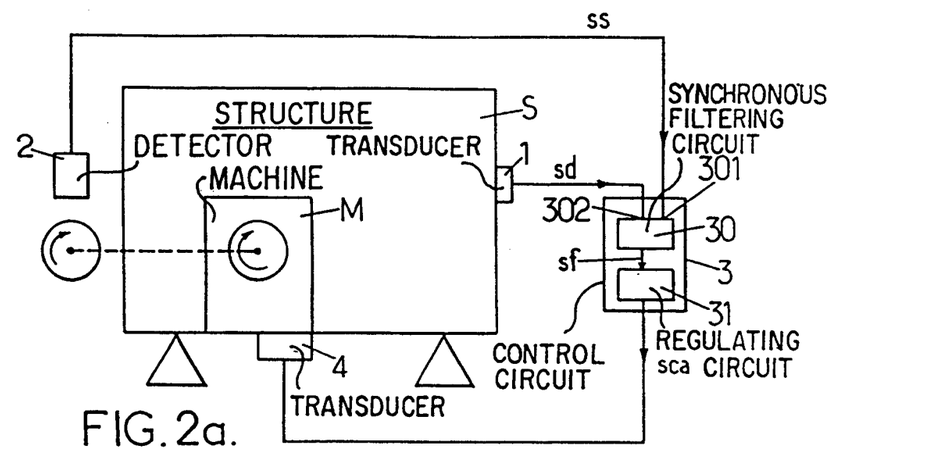
FIG. 2a represents a general schematic diagram of the device for damping the periodic vibrations of a mechanical structure which is the subject of the present invention.

The device according to the invention, as represented in FIG. 2a, comprises at least one transducer 1 detecting these vibrations and delivering a detected signal denoted sd, a detector 2 of the periodicity of these vibrations delivering a synchronizing signal denoted ss, a control circuit 3 and a transducer 4 generating compensation vibrations applied to said mechanical structure S in order to compensate for the periodic original vibrations.

According to a particularly advantageous aspect of the device which is the subject of the present invention, the latter comprises, as represented in FIG. 2a, a control circuit 3 including a circuit for synchronous filtering, denoted 30, of the detected signal sd, this circuit being controlled by the synchronizing signal ss, in such a way as to deliver a filtered signal sf, whose frequency spectrum contains only the instantaneous fundamental frequency of the detected signal sd and/or its harmonic frequencies.

Furthermore, the control circuit 3 comprises a circuit 31 for regulating the filtered signal sf receiving the latter and delivering an antivibration-control signal, denoted sca, applied to the generating transducer 4, in such a way as to minimize the amplitude of the detected signal sd.

According to a particularly advantageous aspect of the device which is the subject of the present invention, the synchronous filtering circuit 30 consists of at least one switched-capacitance filter, this filter receiving on its switching-control input 301 the synchronizing signal as delivered by the detector of periodicity 2, and on a filtering input 302, the detected signal sd.

It will be noted that the synchronous filtering circuit 30 in fact consists of at least one switched-capacitance filter of band-pass filter type, the central frequency of which, controlled by the synchronizing signal ss, corresponds exactly to the instantaneous frequency of the original vibrations or noises produced by the rotating machine M during the operation of the latter. It will be noted that the property of switched-capacitance filters is that their frequency characteristic is not frozen, in contrast to conventional filters, this instantaneous central frequency being very accurately relately related to the frequency of the synchronizing signal ss according to a constant ratio, which can generally be between 10 and 1000. Thus, the instantaneous central frequency of the switched-capacitance filter changes with the variations in speed of the rotating machine M, and the signal transmitted by the filter, that is to say the filtered signal sf, contains only the vibrations produced by the machine, whatever the latter's speed. Thus, the noise and the natural modes which are not correlated with the vibrations of the motor or machine M are rejected.

Figure 2B:
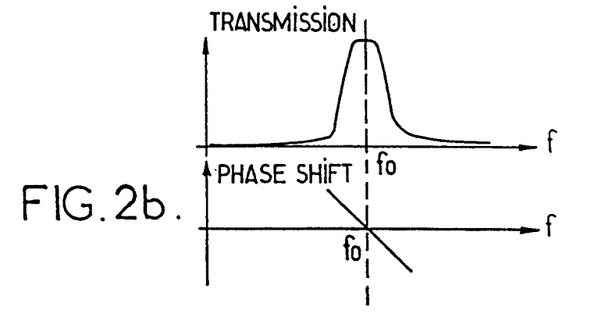
FIG. 2b represents a graph of transmission and phase-shift, as a function of frequency, of a switched-capacitance low-pass type filter.

FIG. 2b shows a graph of the transmission coefficient of the filter as a function of frequency for an instantaneous value f0 of the central frequency of the filter and of the phase shift introduced by this type of filter at the level of the abovementioned instantaneous frequency f0, as a function of frequency, this phase shift being substantially linear and applied to the detected signal sd in order to deliver the filtered signal sf.

It will of course be noted that the switched-capacitance filters can be replaced by an equivalent digital filtering unit including in succession an analog-digital convertor, a digital processor and a digital-analog convertor.

A more detailed description of an advantageous non-limiting embodiment of a device in accordance with the subject of the present invention will be described in connection with FIG. 3 in the case where the mechanical structure S, the seat of periodic vibrations or original noises, includes a source part for the vibrations, represented diagrammatically and purely illustratively in the form of an internal combustion engine M, which is supported by a support part or chassis C, the mechanical structure S being linked to the chassis C by way of a suspension SU. It will furthermore be noted that the chassis C can itself be fixed or mobile, the internal combustion engine M then consisting of the internal combustion engine of a motor vehicle for example.

Figure 3:
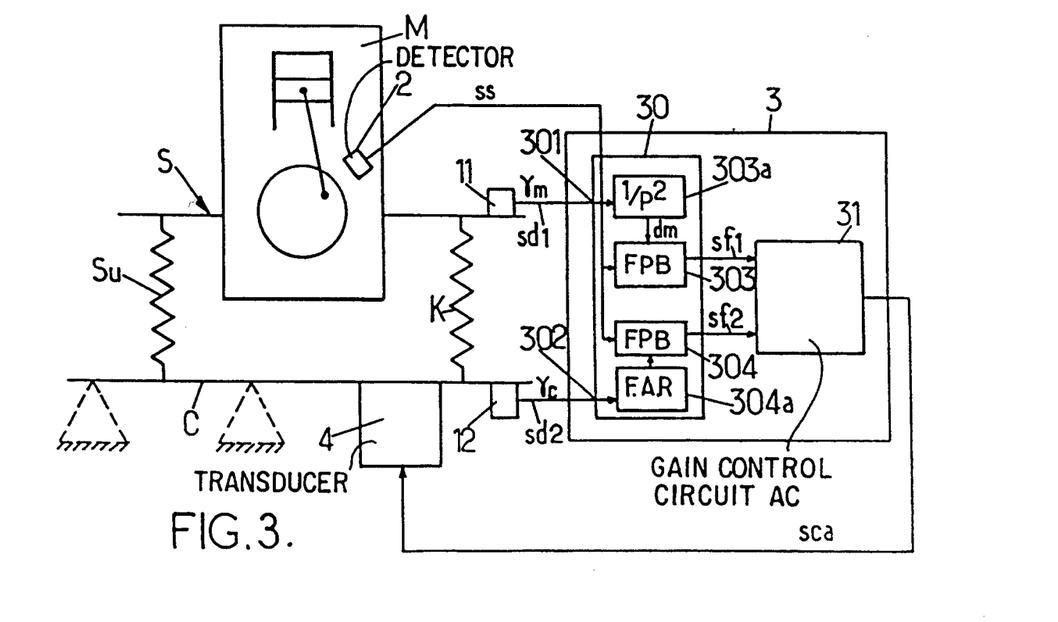

In accordance with a particularly advantageous aspect of the device which is the subject of the present invention, as represented in FIG. 3, the detector transducer 1 is formed by a first detector transducer 11, mechanically joined to the source part or engine M of the original vibrations. It will be noted that the detector 11 delivers a first detected signal denoted sd1.

Furthermore, a second detector transducer 12 is provided, the latter being mechanically joined to the chassis C and delivering a second detected signal sd2.

In the case previously mentioned, the synchronous filtering circuit 30 is then formed by a first 303 and a second 304 switched-capacitance filter receiving the first detected signal sd1, and a second detected signal sd2, respectively, and delivering a first filtered signal sf1, and a second filtered signal sf2, to the regulating circuit 31.

However, as has furthermore been represented in FIG. 3, the first and second transducers 11, 12 can advantageously consist of accelerometers and the corresponding detected signals sd1 and sd2 are delivered to the first switched capacitance filter 303 and a switched capacitance filter 304, respectively, by way of an double integrator, denoted 303a, repsectively and by way of an anti-aliasing filter denoted 304a. Thus, the first switched-capacitance filter 303 receives a signal akin to the displacement of the structure S, the second 304, a signal akin to the acceleration of the chassis C.

As far as the circuit 31 for regulating the filtered signal and receiving the filtered signals sf1 and sf2 is concerned, it will be noted that this regulating circuit 31 delivering an antivibration-control signal sca comprises at least one circuit, denoted GC, for monitoring gain of the signal sf1 as a function of the amplitude of the signal sf2.

It will be noted that, in general, the gain-monitoring circuit GC will be able to comprise an amplifier 310 with adjustable gain (attenuation) receiving the first filtered signal sf1 on its variable-gain input, and a signal proportional to the amplitude of the second filtered signal sf2 on its gain-control input, the output of the variable-gain amplifier 310 delivering the antivibration-control signal sca to the compensation-vibration generating transducer 4, in such a way that the amplitude of the second filtered signal sf2 is rendered minimal.

A more detailed description of a preferred embodiment of the device for damping the periodic vibrations of a mechanical structure which is the subject of the present invention, in the case where the mechanical structure, as previously described within the context of the abovementioned FIG. 3, includes a source part of the vibrations, supported by a support part or chassis C, will now be given in connection with FIG. 4a.

Figure 4A:
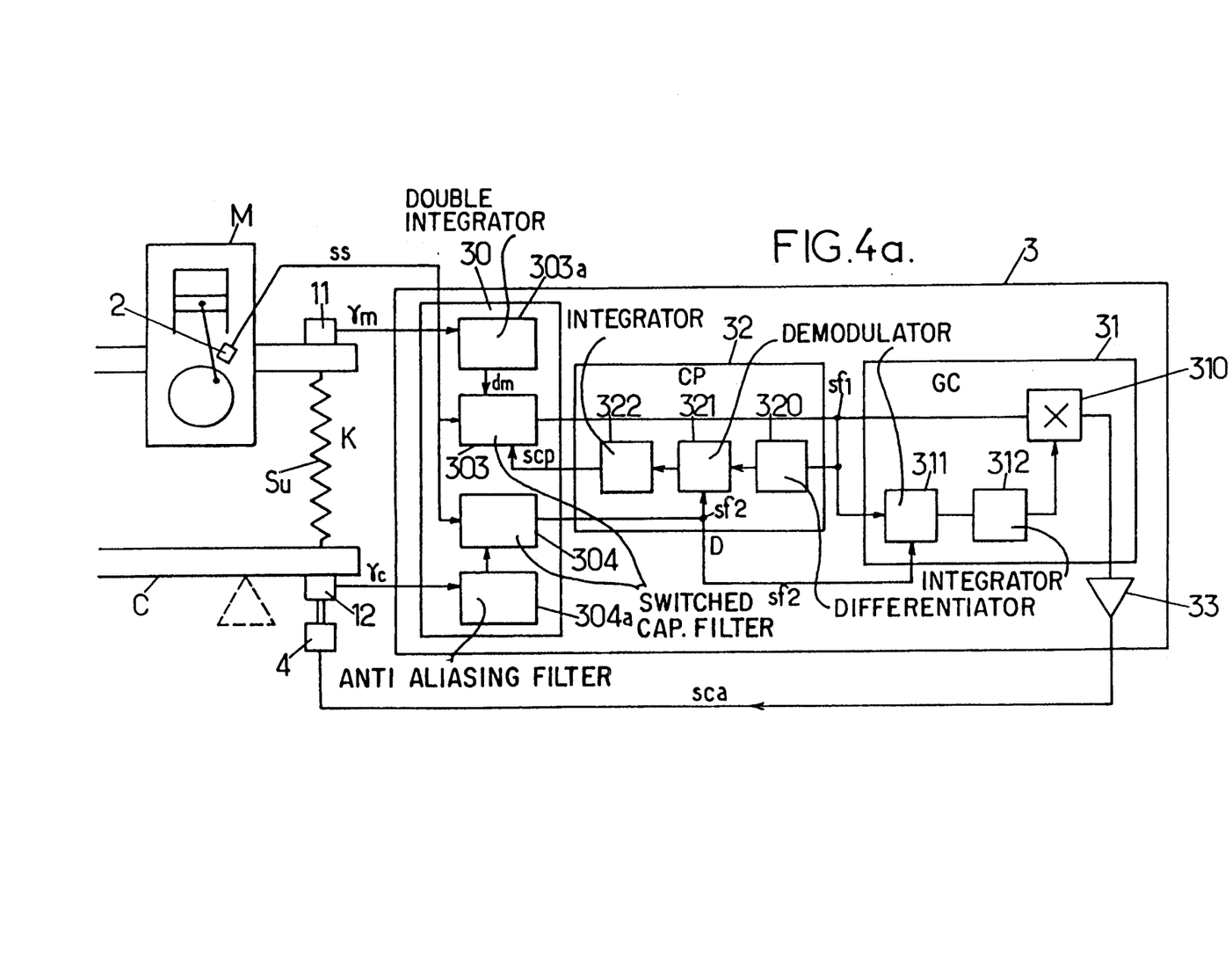
FIG. 4a represents a preferred embodiment of the device for damping periodic vibrations of a mechanical structure which is the subject of the present invention.

In FIG. 4a, the same references designate the same elements as those already described in FIG. 3.

As will be noticed when looking at the abovementioned FIG. 4a, the circuit for regulating the filtered signal and receiving the filtered signal and delivering an antivibration-control signal comprises, furthermore, a phase-monitoring circuit, denoted CP, making it possible to correct the phase shift between the first and second detected signals and/or the first and second filtered signals.

As will be seen in FIG. 4a, the phase-monitoring circuit CP bearing the reference 32 is, for example, placed upstream of the gain-monitoring circuit 31 previously described in the description.

The embodiment of FIG. 4a is given by way of non-limiting example in the case where the engine M is a four-cylinder in-line engine of a motor vehicle, for example. For a frequency of rotation N of the engine, the fundamental of the emitted vibrations has a frequency of 2N. The detector 2 of the periodicity of the vibrations can then advantageously be embodied by a detector of incremental type, an optical detector for example, or even, if appropriate, by a magnetic detector making it possible to detect the teeth of the wheel of a crank shaft of the engine. For a wheel containing 200 teeth, and therefore delivering 200 pulses per revolution of the engine, the detector 2 of the periodicity of the vibrations delivers 100 pulses per vibration period. In such a case, the switched-capacitance filters 303 and 304 can advantageously have a transmitted band centered on 1/100 of the frequency of the synchronizing signal ss. By way of non-limiting example, it will be possible to use switched-capacitance filters marketed by the NATIONAL SEMICONDUCTORS Company under the reference LMF 100 or LMF 120, or by the LINEAR TECHNOLOGY Company under the reference LT 1060.

It will be noted that, since these filters are sampled systems, it will be possible if necessary to append an anti-aliasing filtering at the input of the abovementioned switched-capacitance filters in the case where the low-pass filtering ensured by the double integration at 303a is insufficient to ensure the antialiasing filtering of the sampled spectrum.

In a particularly advantageous manner, as has been represented in FIG. 4a, the gain circuit 31 advantageously comprises a demodulator circuit 311, receiving the first and second filtered signals, sf1, respectively sf2, on its two demodulating inputs, and delivering a demodulated signal. Furthermore, the gain-monitoring circuit comprises an integrator circuit 312, receiving the demodulated signal delivered by the demodulator circuit 311, and ensuring the filtering of the cross-modulation products and the steady-state error compensation of the demodulated signal. The integrator circuit 312 has its output connected up to the gain-control input of the adjustable-gain amplifier 310 which receives on its input, as previously described in the context of 3b, the first filtered signal sf1.

The gain-monitoring circuit GC can also be embodied in digital form, the amplifier 310 being replaced by a multiplier digital-analog convertor forming a digital potentiometer, the signal sf1 being multiplied or attenuated by a coefficient sent in digital form by an analog-digital convertor/microprocessor unit connected up at the output of the integrator circuit 312.

Furthermore, as will be seen in FIG. 4a, the phase-monitoring circuit CP comprises a phase comparator 321 receiving the first filtered signal sf1 on a first comparison input, by way of a differentiating circuit 320, and respectively directly, on a second comparison input, the second filtered signal sf2. The phase-monitoring circuit CP delivers a phase-correction control signal to the first switched-capacitance filter 303, by way of an integrator circuit 322.

It will furthermore be noted that the output of the gain-monitoring circuit 31 and in particular, of the adjustable-gain amplifier 310, is linked to the actuator 4 by way of a power amplifier 33 which can consist of any type of amplifier, such as an thyristor amplifier, or similar, making it possible to provide the supply to the actuator 4.

The operation of the unit as represented in FIG. 4a will be explained in connection with FIG. 4b and with FIG. 4c.

The antivibration-control signal sca is delivered to the actuator 4, which transforms it into a force on the structure or chassis C, in opposition with the force due to the original vibration, or original noise, transmitted directly by the suspension SU. For the attenuation to be effective, it is necessary that the counter-force, that is to say the force engendered by the actuator 4, be opposite in modulus and in phase to the force engendered by the original vibration or noise. Accordingly, in order to maintain a high degree of attenuation in the steady state, and this despite drifting, it is necessary for the system to be autoadaptive.

It will be noted that, in a particularly advantageous way, the active member of the actuator 4 is placed at the level of the second detector transducer 12.

K denotes the stiffness constant of the suspension SU, $\gamma m$ denotes the acceleration-type signal delivered by the first detector 11, $\gamma m$ being representative of the acceleration transmitted by the rotating machine M to the structure S, $\gamma c$ denotes the signal delivered by the second detector 12, γc being representative of the acceleration of the chassis C.

Figure 4B:
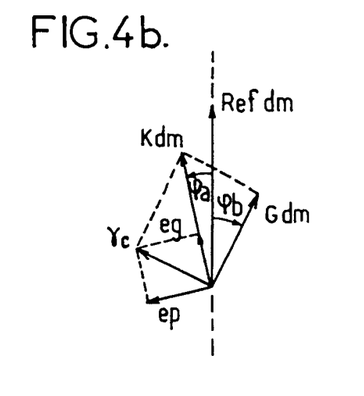
FIG. 4b represents a phase plot, in the Fresnel plane, of the essential physical parameters, or of their representative signals, employed by the preferred embodiment of FIG. 4a, FIG. 4c represents an embodiment detail, in an advantageous non-limiting mode, of a phase-control circuit making it possible to ensure a regulation of the phase of the physical parameters, or of their representative signals, of FIG. 4b.
Figure 4C:
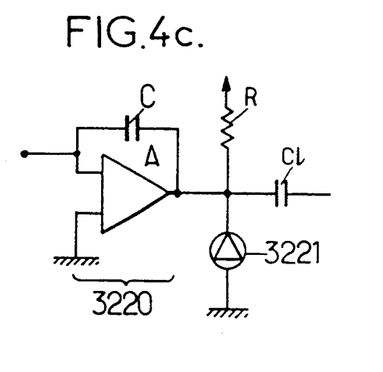

FIG. 4b represents, in the Fresnel plane, the plot of the forces applied by the actuator 4 and by the suspension SU to the chassis C, at the level of the second detector sensor 12. In this figure, dm is the phase reference given by the displacement of the engine M at the level of the first detector sensor 11. The force transmitted by the suspension SU then has the value K.dm, but by reason of the presence of a slight damping, the vector representing this force has a phase advance $\phi a$ such as represented in FIG. 4b.

The force engendered by the actuator device 4 has the value G.dm, but the latter, because of processing delays due to the transfer functions of the circuit for filtering 30 for phase monitoring CP 32 and of the gain-monitoring monitoring circuit CG 31, has a retardation $\phi b$ such as represented in FIG. 4b.

The resulting force measured by the second detector transducer 12, and proportional to γc, equals K.dm+G.dm.

For this letter to be zero, it is necessary, on the one hand, that G=−K in modulus, and, on the other hand, that the phases be opposite, namely $\phi b = -\phi a$. If these two equalities are not satisified, there is a residual vibration γc which breaks down into a component, denoted eg, in phase with the force transmitted by the suspension, K.dm, this component being due to the error in the gain, and a component perpendicular to this same force transmitted by the suspension K.dm. denoted ep, and due to the error in the phase.

The abovementioned gain and phase conditions can then be realized by means of the phase-monitoring circuit CP 32 and of the gain-monitoring circuit CG 31 previously described in the description.

Each of the abovementioned circuits comprises an error-measuring detector, consisting respectively of the demodulator 311 and of the demodulator 321, as well as a means of action modifying the gain, that is to say the adjustable-gain amplifier 310 in the case of the gain-monitoring circuit 31, and respectively the phase, that is to say the integrator circuit 322, which acts on the switched-capacitance filter 303, in the case of the phase-monitoring circuit CP 32. It will be noted that the detector circuits 311 and 321 can consist of a synchronous demodulator, which makes it possible to extract, from a given signal, the component which is in phase with a reference input.

The reference input, in the case of the demodulator 311, consists of the first filtered signal sf1, whereas for the synchronous demodulator 321, the reference input consists of the filtered signal sf1, after differentiation by the differentiator circuit 320, so as to ensure a 90° phase rotation making it possible to measure the quadrature component ep represented in FIG. 4b.

It will be noted on the other hand that the signal demodulated by the reference signal of each of the two abovementioned synchronous demodulators consists, both for the demodulator 311 and the demodulator 321, of the second filtered signal sf2. It will be noted that the use of synchronous demodulators has the effect of rejecting any component perpendicular to the reference input, or any other frequency, or noise. By way of non-limiting example, the abovementioned synchronous demodulators can be embodied by a multiplier effecting the product of the signal subjected to demodulation, that is to say the second filtered signal sf2, and the reference input consisting of the first filtered signal sf1, respectively this first filtered signal sf1 after differentiation by the differentiator 320. It is for example possible to use the multipliers marketed under the reference AD 534 by the ANALOG DEVICES Company, or the multipliers marketed under the reference MC 1595 by the MOTOROLA Company. It will of course be noted that other integrated circuits directly providing the demodulation function can be used, for example the ANALOG DEVICES Ad 630 circuit. Naturally, for the embodying of the synchronous demodulator 311 and 321, it will be possible to use circuits of identical kind, the only difference in operating mode of the synchronous detectors lying in that the reference for monitoring the phase must be a signal perpendicular to the reference for monitoring the gain, namely in phase quadrature. This signal is delivered by the differentiator circuit 320 from the first filtered signal sf1, used as reference for the gain-monitoring circuit. An integrator circuit can moreover be used instead of the differentiator circuit 320.

Generally, it will be understood that the action on the phase is obtained by acting slightly on the synchronizing frequency/central frequency ratio of the bandpass filter, by modifying the electrical characteristics of the filter's components, resistors or capacitors. The filter's curve represented in FIG. 2 shows that around the central value a frequency shift is reflected as a quasi-linear phase variation.

A more detailed description of the phase-correction circuit in a particular non-limiting embodiment will be given in connection with FIG. 4c.

According to the abovementioned figure, the phase-correction circuit 322 comprises an integrator circuit, denoted 3220, including for example an operational amplifier and a capacitor denoted C which are configured as an integrator of Miller integrator type, the abovementioned integrator circuit being followed by a variable-capacitance diode 3221, connected up to a biasing resistance R and to a linking capacitor denoted C1.

According to the embodiment of FIG .4c, the linking capacitor C1 can advantageously be connected up to one or more non-switched capacitor of the switched-capacitance filter, the variable-capacitance diode 3221 then being connected up in parallel with the non-switched capacitor of the abovementioned switched-capacitance filter.

On varying the output voltage delivered by the integrator 3220, the biasing voltage of the variable-capacitance diode 3221 varies, and the corresponding equivalent capacitance, which makes it possible to vary the non-switched equivalent capacitance of the switched-capacitance filter, and ultimately the corresponding phase shift for the central frequency f0, represented in FIG. 2, in order to compensate for the abovementioned phase shift, according to the linear law of variation represented in this figure.

It will be noted that the mode of action on the phase described previously is not limiting. It is furthermore possible to act on the phase through a control of the synchronizing frequency, that is to say through the signal as delivered to the corresponding switched-capacitance filter 303.

Naturally, monitoring of the phase can be carried out with digital technology.

In such a case, a multiplier digital-analog convertor can be used to adjust the frequency of the band in relation to the synchronizing frequency of the filter, this multiplier digital-analog convertor being driven by a microprocessor and by an analog-digital convertor receiving the phase-error signal. For this purpose, the digital-analog convertor can be omitted when the filter used is a filter which is directly programmable by micro-processor. Furthermore, the filtering, the demodulation and all the processing of the signals γm and γc up to the output to the actuator 4 can be carried out with digital technology, given significant computational power.

Lastly, the output from the synchronous demodulators through the low-pass type circuits of high gain, or even an integrator 312 and 322, will be noted, this affording the two advantages: suppression of the high-frequency component of the demodulators and zero error in the steady state.

Figure 5:
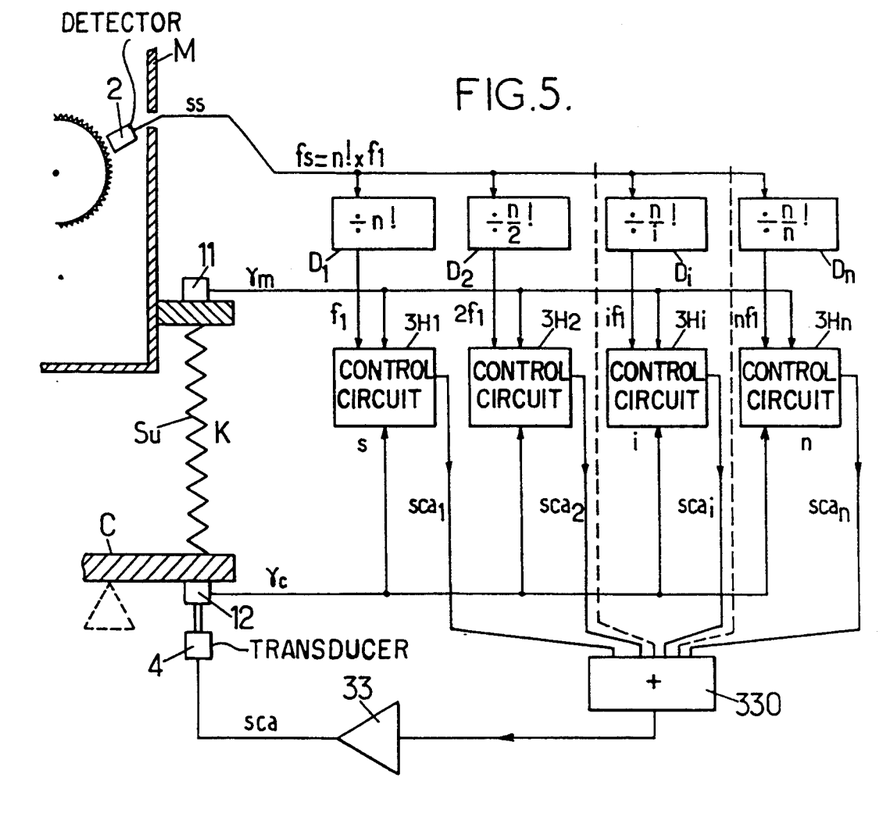
FIG. 5 represents a variant embodiment of the device represented in FIG. 4a in which, when the original periodic vibration is very far from a sinusoidal vibration, a plurality of harmonics of a synchronizing signal, representing the fundamental of this original vibration, is employed in order to reconstitute the antivibration-compensation signal.

A more detailed description of a variant embodiment of the device which is the subject of the present invention making it possible to obtain a very high accuracy of reconstitution of the damping-control signal sca and, finally, an attenuation of the original vibration better than 10% of the latter, will be described in connection with FIG. 5. The abovementioned embodiment is particularly advantageous in the case where the original vibrations consist of a non-sinusoidal periodic signal. In such a case, the device as described previously in FIG. 4a, for example, can then be duplicated as a function of the number of harmonic frequencies constituting the previously-mentioned nonsinusoidal periodic signal. In this case, the only change to be made consists solely in the modification of the frequency of the synchronizing signal as for the corresponding switched-capacitance filters. Thus, if f1 designates that frequency of the synchronizing signal sent to the corresponding stage intended to process the fundamental of the abovementioned periodic vibration, the synchronising signal of frequency 2.f1 makes it possible to process the harmonic 2 and so on, the corresponding circuits being identical.

Thus, each control circuit, denoted 3Hi, where i designates the rank of the corresponding harmonic, includes a synchronous filtering circuit 30, a gain-monitoring circuit 31 and a phase-monitoring circuit 32, which are identical to those described in connection with 4a, the power amplifier 33 being common to all the circuits 3Hi. The frequencies f1, f2 . . . fn can be obtained as follows: each switched-capacitance filter of rank i receives the synchronizing signal as at frequency fs by way of a divider by-n!/i Di.

Each corresponding synchronous filtering circuit of rank i delivers respectively the corresponding filtered signal sf1i, sf2i. The corresponding regulating circuits of rank i are connected up in parallel with the generating transducer 4 by way of an adder 330 feeding into the power amplifier 33.

It will thus be noted that each control circuit 3Hi thus functions independently of the others whose rank differs.

A device for damping the periodic vibrations of a mechanical structure has thus been described, which is particularly powerful, in so far as the device which is the subject of the present invention makes possible an operating mode capable of eliminating the disadvantages of the currently known devices of the prior art. It will be noted in particular that the field of application of the device for damping periodic vibrations of a mechanical structure according to the invention can be used in a very wide field of applications for supporting any type of vibrating machine. It will be noted that, if appropriate, the device which is the subject of the present invention can advantageously be applied to the supporting and to the attenuating of the periodic vibrations of a mechanical structure in three reference directions, the first and second detector transducers 11 and 12 then consisting, for example, of accelerometers, being triplicated and distributed along reference directions, for example those of a reference trihedron. In this case, a control circuit 3 such as represented in FIG. 4a, or a plurality of control circuits 3Hi such as represented in FIG. 5, is then naturally associated with each pair of first and second detector transducers 12, respectively.

I claim:

1. A device for damping periodic vibrations of a mechanical structure, comprising at least one transducer detecting these vibrations and producing a detected signal, a detector of the periodicity of these vibrations producing a synchronizing signal, a control circuit connected to said at least one transducer and said detector, and a transducer connected to said control circuit for generating compensation vibrations applied to said mechanical structure in order to compensate for the periodic vibrations, wherein said control circuit includes in a cascade connection:

a filtering circuit for synchronous filtering of said detected signal from said at least one transducer, in accordance with said synchronizing signal from said detector and, said filtering circuit producing a filtered signal whose frequency spectrum contains only at least one of an instantaneous fundamental frequency of said detected signal and its harmonic frequencies; and a regulating circuit for regulating said filtered signal, for receiving said filtered signal from said filtering circuit, and for producing an antivibration-control signal applied to said transducer for generating compensation vibrations, in such a way as to minimize the amplitude of said detected signal.

2. The device as claimed in claim 1, wherein said filtering circuit comprises at least one switched-capacitance filter, of band-pass type and having a switching control input and a filter input, for receiving said synchronizing signal from said detector on said switching control input and said detected signal from said at least one transducer on said filtering input.

3. The device as claimed in claim 1, wherein said mechanical structure constitutes a source of periodic vibrations and includes a source part for generating said vibrations, said source part being supported by a support part, or chassis by way of a suspension, said at least one transducer detecting the vibrations comprising:

a first detector transducer, mechanically joined with said source part for generating said vibrations and producing a first detected signal related to a displacement of said mechanical structure; and a second detector transducer, mechanically joined to said chassis and producing a second detected signal related to an acceleration of said chassis, said filtering circuit including first and second switched-capacitance band-pass filters for respectively receiving the first and second detected signals and for respectively producing first and second filtered signals which are fed to said regulating circuit.

4. The device as claimed in claim 3, wherein said first and second detector transducers comprise accelerometers, said first and second detected signals being fed to said first and second switched-capacitance filters through a double integrator and an antialiasing filter, respectively.

5. The device as claimed in claim 3, wherein said regulating circuit comprises a gain-monitoring circuit comprising an adjustable-gain amplifier including a variable-gain input and a gain control input, for receiving said first filtered signal on said variable-gain input and a signal proportional to the amplitude of said second filtered signal on said gain-control input, and for producing said antivibration-control signal which is fed to said compensation-vibration generator in such a way that the amplitude of said second filtered signal is a minimum.

6. The device as claimed in claim 5, wherein said regulating circuit further comprises at least one phase-monitoring circuit making it possible to correct a phase shift occurring between at least one of said first and second detected signals and said first and second filtered signals.

7. The device as claimed in claim 5, wherein said gain-monitoring circuit receiving said signal proportional to the amplitude of the second filtered signal comprises connected in cascade:
   a demodulator circuit, including two demodulating inputs, for receiving said first and said second filtered signals on said two demodulating inputs, and for producing a demodulated signal; and
   an integrator circuit for receiving said demodulated signal and for providing filtering of cross-modulation products and steady-state error compensation of said demodulated signal, said integrator circuit having an output connected to the gain-control input of said adjustable-gain amplifier.

8. The device as claimed in claim 6, wherein said phase-monitoring circuit includes a phase comparator for receiving said first filtered signal through a differentiating circuit on a first comparison input and said second filtered signal on a second comparison input respectively, and for producing a phase correction control signal, said first switched-capacitance filter receiving said phase correction control signal through an integrated circuit, phase correction being obtained by shifting an instantaneous frequency of said first switched-capacitance filter.

9. The device as claimed in claim 8, wherein said integrator circuit is followed by a variable-capacitance diode connected up in parallel with a non-switched capacitor of said first switched-capacitance filter.

10. The device as claimed in claim 1, including a plurality of identical control circuits of given rank i connected in parallel, where i designates the rank of a harmonic frequency of said periodic vibration to be processed, each control circuit of said plurality of identical control circuits receiving said first and second detected signals and any control circuit of given rank i receiving a synchronizing signal whose frequency is a multiple, with a ratio i, of the synchronizing signal frequency received by the control circuit of rank 1, related to said fundamental frequency of said periodic vibration to be attenuated, each control circuit being connected to said transducer through an adder cascade connected to a power amplifier, thereby allowing vibrations comprising a non-sinusoidal periodic signal to be damped.

* * * * *